US008413196B2

(12) United States Patent
Hasha

(10) Patent No.: US 8,413,196 B2
(45) Date of Patent: Apr. 2, 2013

(54) AUDIO VISUAL ARCHITECTURE

(75) Inventor: Richard Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1690 days.

(21) Appl. No.: 11/266,034

(22) Filed: Nov. 2, 2005

(65) Prior Publication Data

US 2006/0114727 A1    Jun. 1, 2006

Related U.S. Application Data

(62) Division of application No. 09/322,643, filed on May 28, 1999, now Pat. No. 7,039, 943.

(60) Provisional application No. 60/118,668, filed on Feb. 3, 1999.

(51) Int. Cl.
*H04N 7/18* (2006.01)
*H04N 7/173* (2011.01)

(52) U.S. Cl. ............... 725/80; 725/81; 725/82; 725/133

(58) Field of Classification Search ............. 725/37, 725/133, 135, 136
See application file for complete search history.

(56) References Cited

U.S. PATENT DOCUMENTS

| 5,390,138 A | 2/1995 | Milne et al. | |
| 5,550,816 A | 8/1996 | Hardwick et al. | |
| 5,621,662 A | 4/1997 | Humphries et al. | 364/550 |
| 5,675,390 A | 10/1997 | Schindler et al. | 348/552 |
| 5,724,517 A | 3/1998 | Cook et al. | |
| 5,731,844 A * | 3/1998 | Rauch et al. | 725/40 |
| 5,796,945 A | 8/1998 | Tarabella | |
| 5,799,041 A | 8/1998 | Szkopek et al. | 375/259 |
| 5,805,763 A * | 9/1998 | Lawler et al. | 386/296 |
| 5,867,223 A * | 2/1999 | Schindler et al. | 348/552 |
| 5,883,621 A * | 3/1999 | Iwamura | 725/37 |
| 6,177,931 B1 * | 1/2001 | Alexander et al. | 725/52 |
| 2003/0063601 A1 | 4/2003 | Niida et al. | |
| 2003/0185545 A1 * | 10/2003 | Young et al. | 386/83 |
| 2005/0204389 A1 * | 9/2005 | Proehl et al. | 725/60 |
| 2005/0278747 A1 * | 12/2005 | Barton et al. | 725/58 |

FOREIGN PATENT DOCUMENTS

| EP | 0 854 607 A1 | 7/1998 |
| WO | WO 97/31451 | 8/1997 |

OTHER PUBLICATIONS

Ansell, et al., "An architecture for the design of TMN applications," *Proceedings of the International Conference on Communications*, 1993, 1635-1639.

(Continued)

*Primary Examiner* — Nasser Goodarzi
*Assistant Examiner* — Fred Peng
(74) *Attorney, Agent, or Firm* — Woodcock Washburn LLP

(57) ABSTRACT

Aspects of an audio/visual architecture are disclosed. In one aspect, a system is disclosed where the system has a media manager object, an audio/visual program, and a player/recorder object so that when the program is selected, the media manager dynamically loads the player/recorder object for either playing or recording the program. For example, with respect to the media manager object, it can manage a collection of related program entities and any corresponding player/recorder components. Also, the media manager can allocate share source ports and shared sink ports in order to dynamically create virtual circuit paths for selected program entries.

16 Claims, 14 Drawing Sheets

OTHER PUBLICATIONS

Auer, et al., "Das informationsmodell: ein konzept fur das management offener kommunikationssysteme," *Frequenz*, 1993, 47(1-2).

Friesen, et al., "DAVE: a plug-and-play model for distributed multimedia application development," *IEEE Parallel & Distribution Technology*, 1995.

Schapeler, et al., "Model based maintenance for MANs," *1225 Electrical Communication*, 1993, 268-277.

Sony, et al., "The HAVI specification: specification of the home audio/video interoperability (HAVI) architecture: version 1.0 beta," *HAVI Organization*, San Ramon, CA, US.

U.S. Appl. No. 09/322,455, filed May 28, 1999, Hasha.

In the United States Patent and Trademark Office, Non-Final Office Action, in re U.S. Appl. No. 11/205,727, filed Aug. 15, 2005, Dated Nov. 25, 2008, 31 pages.

* cited by examiner

AUDIO VISUAL ARCHITECTURE

CROSS REFERENCE TO RELATED APPLICATIONS

This application is a divisional of U.S. application Ser. No. 09/322,643, filed May 28, 1999, which is hereby incorporated by reference in its entirety.

This application is related to co-pending application U.S. application Ser. No. 11/205,727, filed on Aug. 15, 2005, entitled "Audio Visual Architecture".

TECHNICAL FIELD

The described technology is related to audio/visual systems.

BACKGROUND

A large environment, such as a large building or a large house, may have many audio/video devices located throughout the environment. These AV devices may include CD players, speaker systems, computer systems, television receivers, satellite receivers, displays, and so on. In addition, many sources of media may be available. One such media is a jukebox containing a variety of compact discs. The AV devices typically provide a control panel through which the device can be controlled. For example, a CD player provides a control panel that allows a CD to be started, paused, or stopped. Typically, the interconnections between the AV devices are static. That is, when the AV devices are installed, cabling is routed between devices. For example, speaker wire may be routed between an amplifier and speakers.

A problem with such static interconnections it is very expensive and difficult to provide all the desired interconnections and to change connections. Another problem is that it is cumbersome to use only the control panels to control the devices. It would be desirable to have an architecture that would support the dynamic interconnection between devices.

SUMMARY

In various aspects of the presently disclosed subject matter an audio/visual system is provided, where the system may have a media manager object, an audio/visual program, and a player/recorder object, so that when the audio/visual program is selected, the media manager dynamically loads the player/recorder object for either playing or recording the visual program. Thus, in one aspect, the media manager object may be a hierarchically organized resolver of a player/recorder component when the audio/visual program is presented to the media manager object. In another aspect, the media manager object can manage a collection of related audio/visual program entities and corresponding player/recorder components. In yet another aspect, the media manager object can allocate shared source ports and shared sink ports to dynamically create a virtual circuit path for a selected audio/visual program entry.

In another aspect, the presently disclosed subject matter may comprise of instantiating a player/recorder object and self-resolving an audio/visual program to a player/recorder associated with a player/recorder object in accordance with a selection of the audio/visual program. Any one of an operating system, driver code, an application programming interface, a tool kit and a processing device may be used to provide for such instantiation and self-resolving.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Each output component (e.g., laserdisc player or output software component) has a source port associated with each type of the output signal that it can output. For example, an output component may output a video signal in RGB format through one source port and may output audio signal in AES format through another source port. Each input component (e.g., speaker system or input software component) has a sink port associated with each type of input signal that it can input. For example, an input component may input a signal in RGB format through one sink port. The AV system models each port with a corresponding port object. The AV system has a corresponding primitive source port object for each source port and a corresponding primitive sink port object for each sink port.

Each source port can be connected to one or more input ports. For example, a source port that outputs a video signal can be connected to the input ports of several monitor devices.

The path between a source port and a sink port can be static or dynamic. A static path may correspond to a direct connection between a source port and a sink port of the output component. A dynamic path can be established through a switching mechanism. A switching mechanism allows for its sink ports to be connected to its source ports so that a path can be established. The connection can be a virtual circuit or a transport medium. For example, a certain bandwidth of the transport medium may be allocated for the connection. The path between a source port and a sink port is referred to as a primitive circuit. A primitive circuit may be a direct path between a source port of an output component and a sink port of an input component. A primitive circuit may also be a path between a source port of an output component with an input switching port (a type of sink port) of a switching mechanism. Similarly, a primitive circuit may be a path between an output switching port (a type of source port) of a switching mechanism to a sink port of an input component. The AV system has a corresponding primitive circuit object for each path with a signal origination from a source port and/or terminating at a sink port, corresponding input switching port object for each input switching port, and an output switching port object for each output port.

Figure 1:
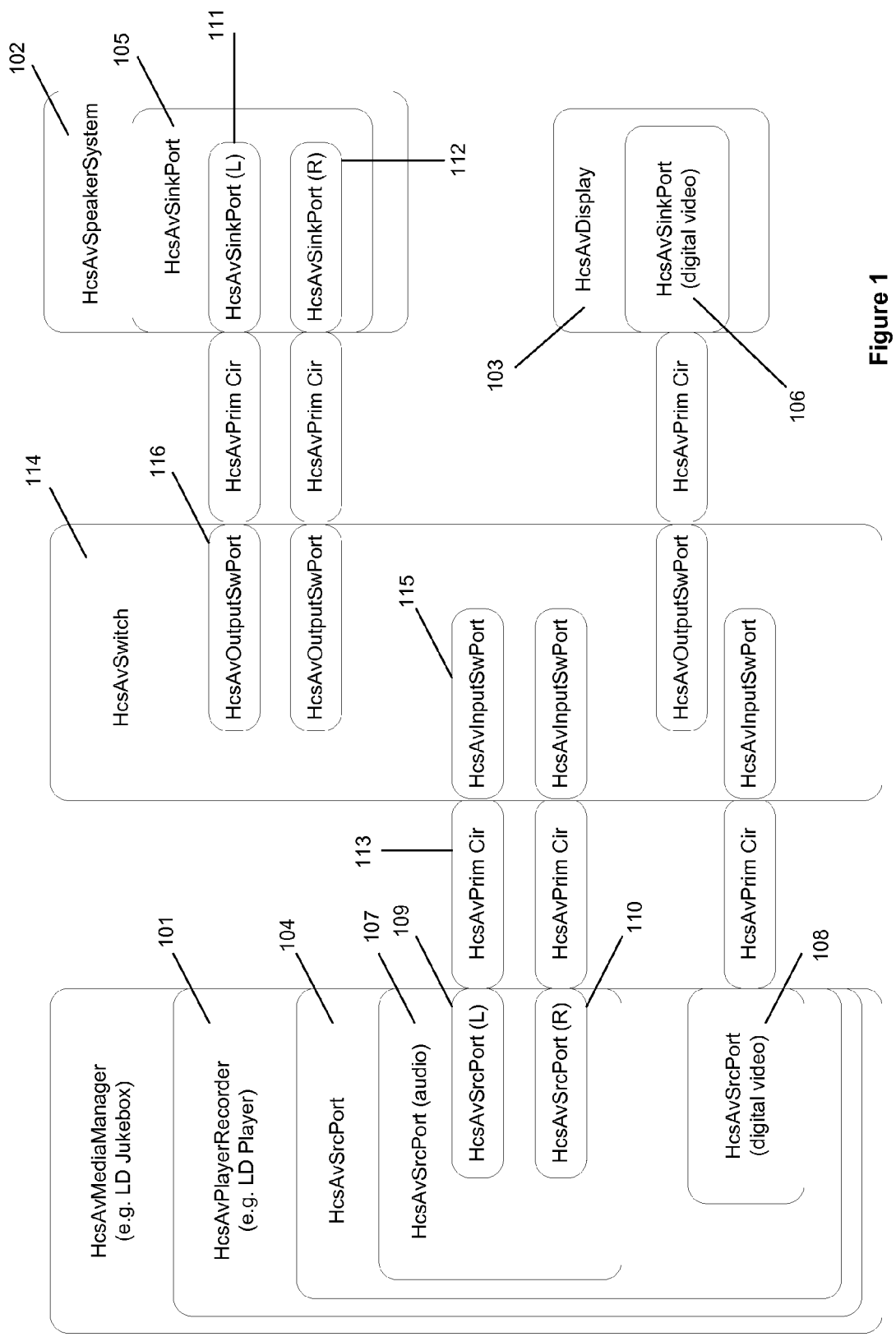
FIG. 1 is a block diagram illustrating network layer objects that model the path between output components, switching mechanisms, and input components.

FIG. 1 is a block diagram illustrating network layer objects that model the path between output components, switching mechanisms, and input components. In this example, a laserdisc player is connected to a speaker system and a display. The laserdisc player includes three physical source ports: one for digital video, one for left audio, and one for right audio. The source ports have a direct path to input switching ports of the switching mechanism. The speaker system has two sink ports: one for left audio and one right audio. The display has a sink port for digital video. The sink ports of the output devices have direct paths to the output switching ports of the switching mechanism. The AV system represents each of these components with a corresponding object in memory. The player recorder object 101 corresponds to the laserdisc player. The speaker system object 102 corresponds to the speaker system, and the display object 103 corresponds to the display. The AV system represents multiple ports of a component by a single aggregating port object. The source port object 104 corresponds to the source ports of the laserdisc player, the sink port object 105 corresponds to the sink ports of the speaker system, and the sink port object 106 corresponds to the sink port of the display. Each port object may contain nested port objects to organize the ports of a component in a hierarchy. In this example, the source ports of the laserdisc player are represented by an aggregate source port object 104 that contains two child source port objects. A one child source port object 107 represents the audio source ports, and the other child source port object 108 represents the video source port. The source port object representing the audio source port contains two source port objects. One source object 109 represents the left audio source port, and the other source port object 110 represents at the right audio source port. Similarly, the sink port object 105 represents the sink ports of the speaker system and contains two child sink ports. One sink port object 111 represents the left audio sink port, and the other child sink port object 112 represents the right audio sink port. Since the display has only one sink port, its corresponding sink port object 106 has no child sink ports. A source port object or a sink port object that has no child port is referred to as a primitive port object. For example, source port objects 109 and 110 are primitive source ports. A port object that is not a child of any other port object is referred to as a complete port object. For example, source port object 104 is a complete source port object. Sink port object 106 is both a primitive sink port object and a complete sink port object.

The AV system may represent each path by a primitive circuit object. In this example, primitive circuit object 113 corresponds to a direct path between the left audio source port of the laserdisc player and an input switch port of the switching mechanism. The AV system represents the switching mechanism by a switch object 114. A switch object contains an input source port object 115 for each of its input switch ports and an output switch port object 116 for each of its output switch ports.

Figure 2:
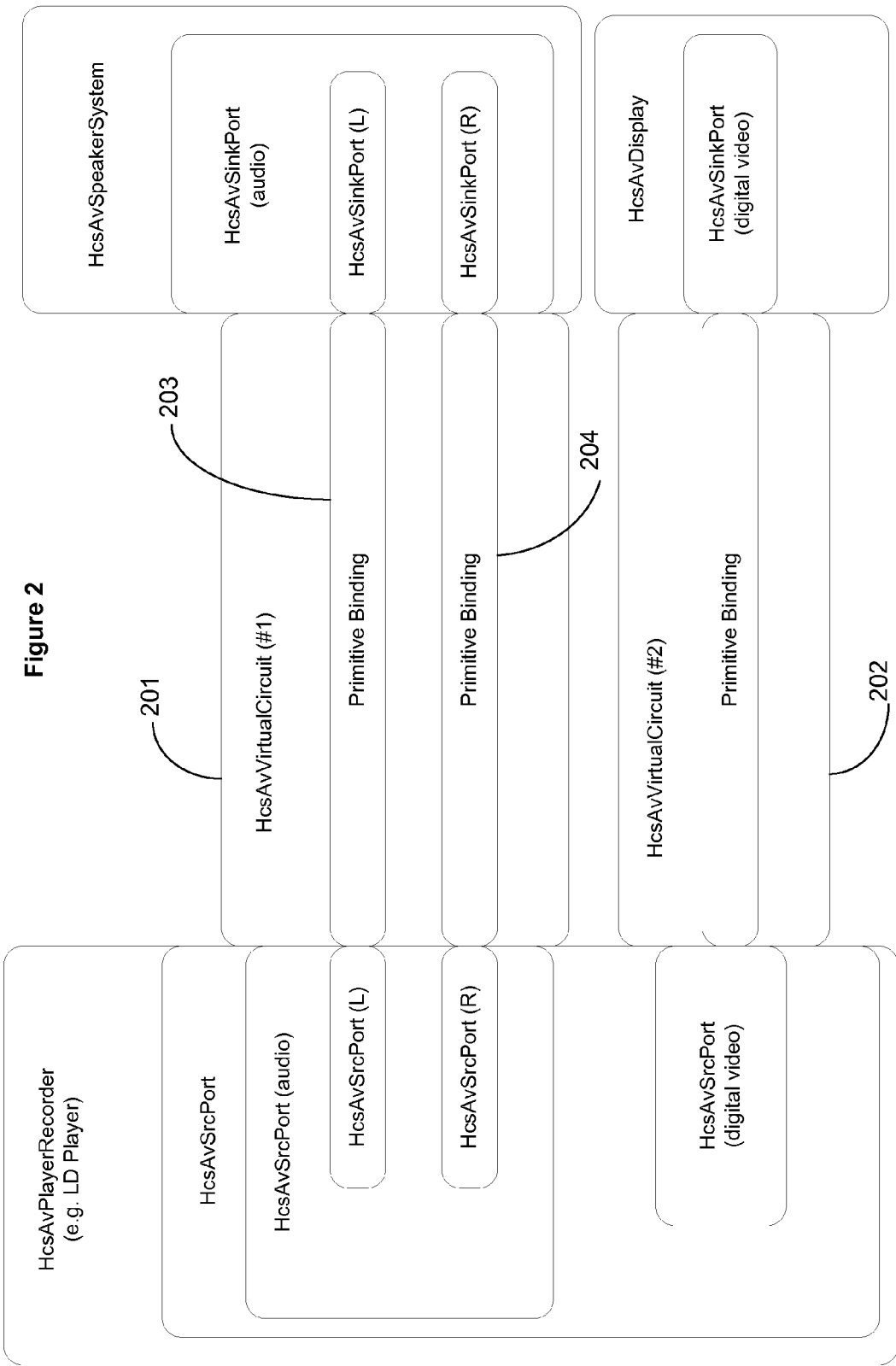
FIG. 2 is a block diagram illustrating the session layer objects that represent virtual circuits.

The AV system represents a path for a signal between a complete source port and a complete sink port by a virtual circuit. A signal models actual informational context that is on a path. A virtual circuit may represent static and dynamic connections. FIG. 2 is a block diagram illustrating the session layer objects that represent virtual circuits. The AV system represents a virtual circuit by a virtual circuit object. The virtual circuit object 201 corresponds to the path between the complete source port of the laserdisc player and the complete sink port of the speaker system. The virtual circuit object 202 corresponds to the path between the source port of the laserdisc player and the complete sink port of the display. The virtual circuit object 201 corresponds only to the audio source ports of the laserdisc player, and the virtual circuit object 202 corresponds only to the video source ports of the laserdisc player. Each virtual circuit object contains a primitive binding information corresponding to each of the paths within that virtual circuit. For example, the virtual circuit object 201 contains a primitive binding information 203 and 204. The AV system allows each source port to be connected to multiple sink ports.

Figure 3:
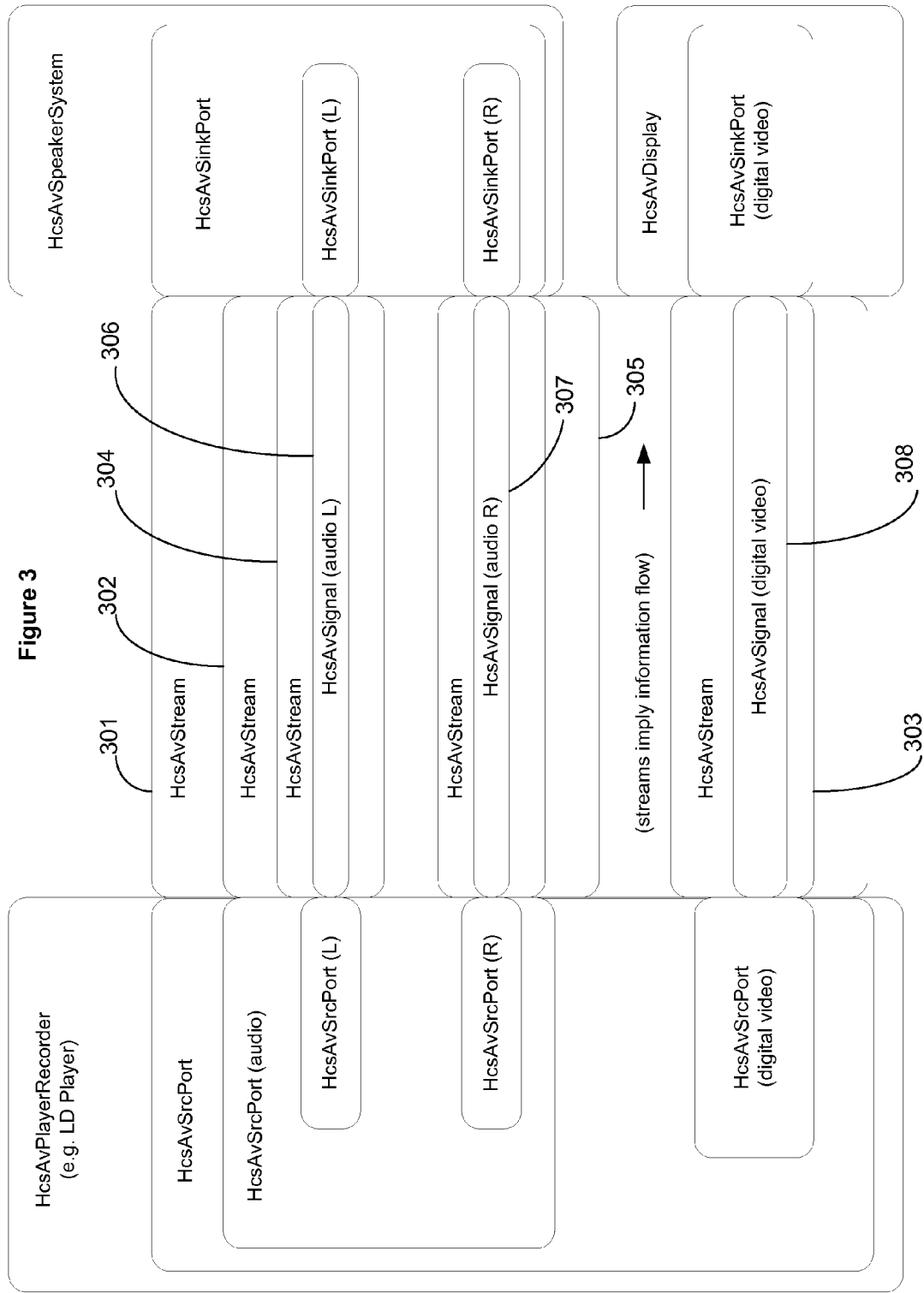
FIG. 3 is a block diagram illustrating management laser objects.

FIG. 3 is a block diagram illustrating management layer objects. The AV system represents the signals that are output by the source ports of an output component as a stream. That is, each output outputs a stream of signals. The signals within the stream are hierarchically organized in a manner that is similar to how source ports are organized within a complete source port. The AV system represents the stream of an output component by a stream object that may contain other stream objects. In this example, the output signals of the laserdisc player are represented by stream object 301. The audio signals of the laserdisc player are represented by child stream object 302, and the video signal of the laserdisc player is represented by child stream object 303. The audio stream object contains a child stream object 304 representing the left audio signal and a child stream object 305 representing the right audio signal. A stream object that does not contain other stream objects is referred to as a primitive stream object. A stream object that is not contained within other stream objects is referred to as a complete stream object. For example, stream object 301 is a complete stream object, and stream object 304 is a primitive stream object. Each primitive stream object contains a signal object that corresponds to the signal that is output by the corresponding source port. Signal object 306 corresponds to the signal that is transmitted between the left audio source port of the laserdisc player and the left sink port of the speaker system. Signal object 307 corresponds to the signal that is transmitted between the right audio source of the laserdisc player and the right sink port of the speaker system. Signal object 308 corresponds to the signal that is transmitted from the video source port of the laserdisc player to the sink port of the display.

Figure 4:
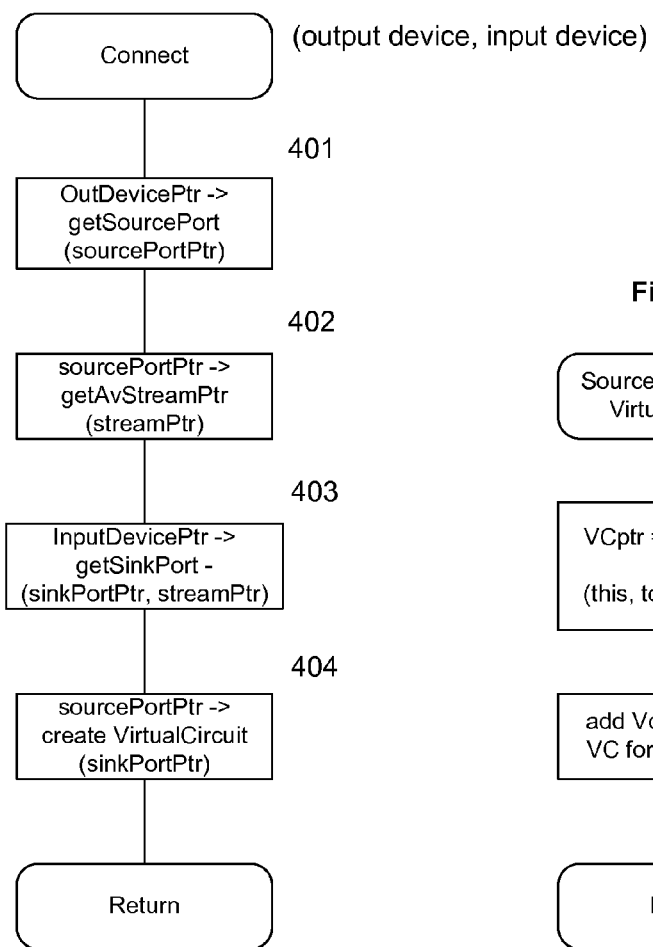
FIG. 4 is a diagram illustrating the establishment of a path between an output component and an input component.

FIG. 4 is a diagram illustrating the establishment of a path between an output component and an input component. A path is established using an object that represents the output component and an object that represents the input component.

In step 401, the process requests the output object to provide a pointer to a complete source port object. In step 402, the process requests the source port object for a pointer to its complete stream object. In step 403, the process requests the input object to provide a pointer to its complete sink port object. In step 404, the process asks the source port object to create a virtual circuit object that establishes a path between the source port to the sink port. The process is then complete.

Figure 5:
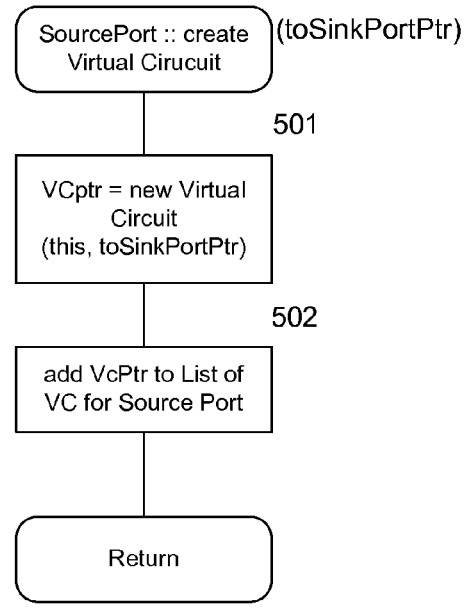
FIG. 5 is a flow diagram representing a function of a complete source port object for creating a virtual circuit object.

FIG. 5 is a flow diagram representing a function of a complete source port object for creating a virtual circuit object. This function performs the processing necessary to establish a path for a signal between a primitive source port and a primitive sink port. The create virtual circuit function is passed a pointer to the sink port object. In step 501, the function creates a new virtual circuit object passing a pointer to the source port object and a pointer to the sink port object. In step 502, the function adds the virtual circuit object to a list of virtual circuits for the source port object. The function then returns.

Figure 6:
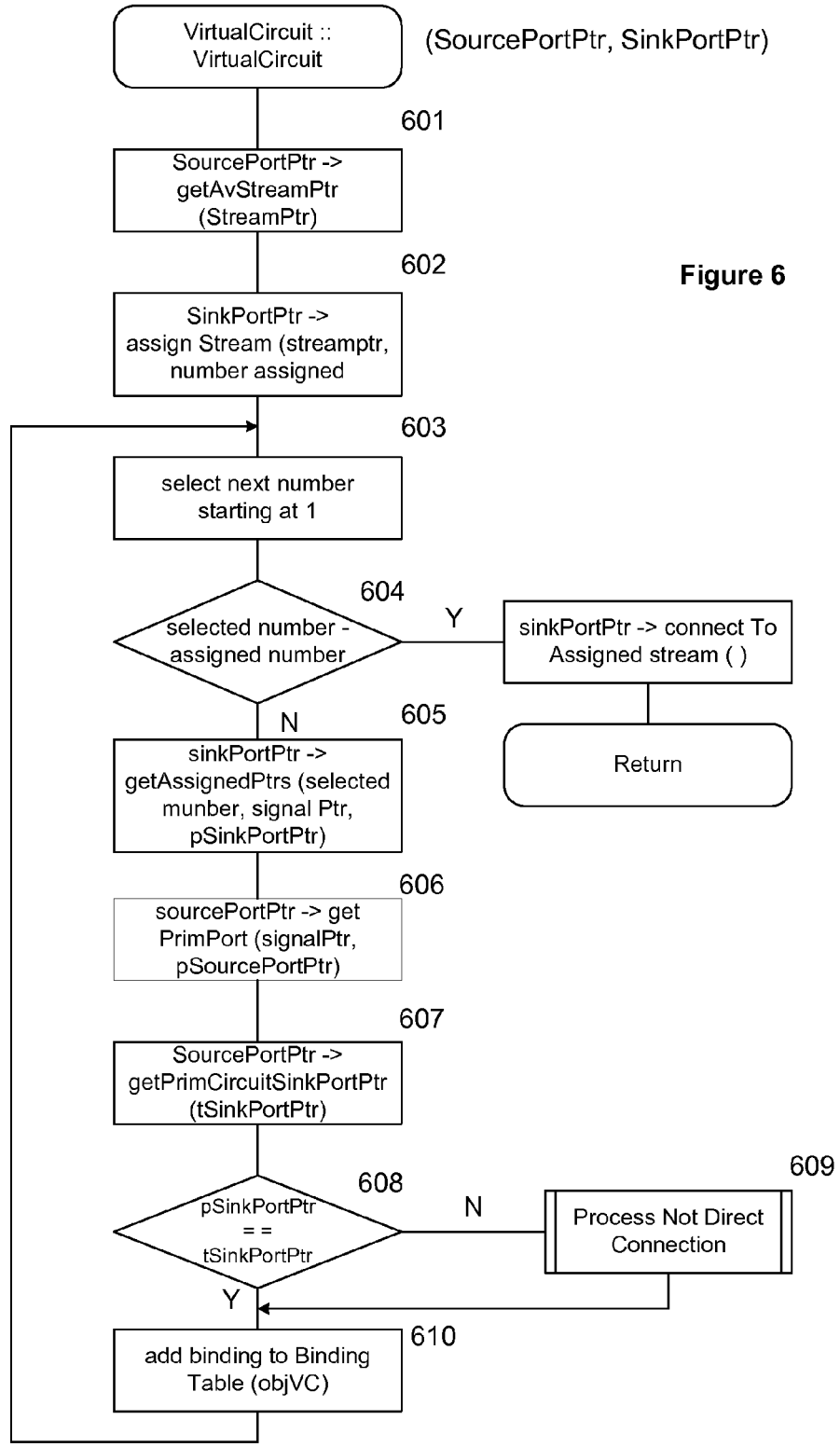
FIG. 6 is a flow diagram of example implementation of the constructor for a virtual circuit object.

FIG. 6 is a flow diagram of example implementation of the constructor for a virtual circuit object. The constructor is passed a pointer to a source port object and a pointer to a sink port object. In the step 601, the constructor retrieves a pointer to the stream associated with the source port object. In step 602, the constructor assigns the stream to the sink port object by invoking the assign stream function of the sink port object passing a pointer to the stream object. The assign stream function returns the number of signal objects within the stream object that are assigned to the complete sink port object. In steps 603-610, the constructor loops creating a primitive binding object for each signal object that is assigned to the sink port object. In step 603, the constructor selects the next signal number starting with 1. In step 604, if the selected number is greater than the number of assigned signals, then the constructor returns, else the constructor continues at step 605. In step 605, the constructor retrieves a pointer to the primitive sink port object corresponding to the numbered signal object and retrieves a pointer to the signal object itself. The constructor retrieves these pointers by invoking the get assignment pointer function of the sink port object. In step 606, the constructor retrieves a pointer to the primitive source port object for the corresponding signal port object. In step 607, the constructor retrieves a pointer to the sink port object of the primitive source port object. In step 608, if the primitive sink port object of the primitive circuit of the primitive sink port object is the same as the primitive sink port object of the primitive circuit of the primitive source port object, then a direct connection exists between the source port and the sink port. Otherwise, the connection is through a switching mechanism. If the connection is through a switching mechanism, then the constructor continues at step 609, else the constructor continues at step 610. In step 609, the constructor invokes a process-not-direct-connection function. In step 610, the constructor adds an identification of the binding from the primitive source port to the primitive sink port to the binding table of the virtual circuit object. A binding represents the identity of the primitive source port object and the primitive sink port object. If the connection is not direct, the binding also includes the identity of the input switch port object and the output switch port object of the switching mechanism. The function then loops to step 603 to process the next signal object.

Figure 7:
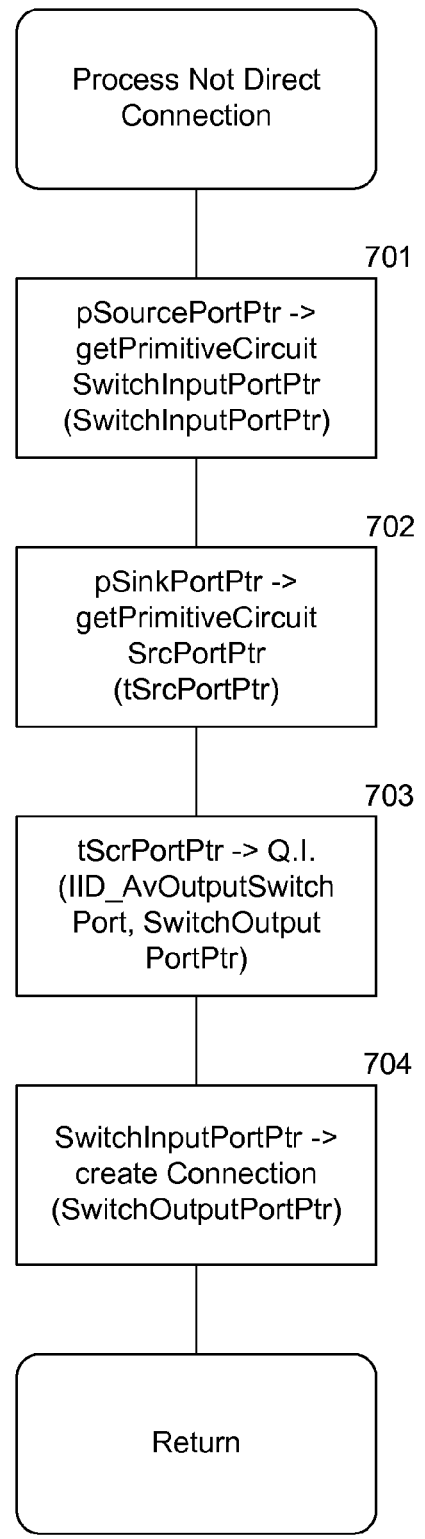
FIG. 7 is a flow diagram illustrating an example implementation of process-not-direct-connection function.
Figure 8:
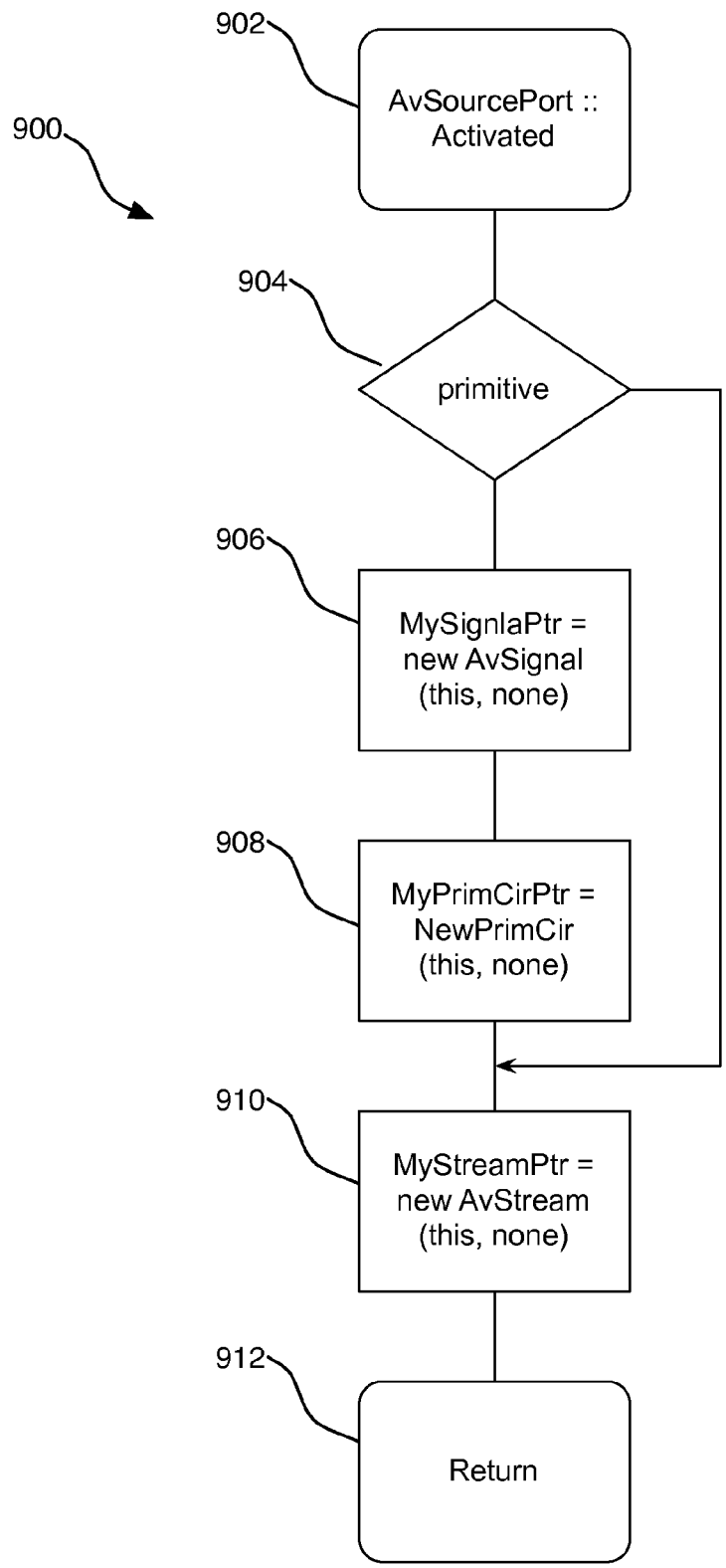
FIG. 8 is a flow diagram illustrating an example implementation of an activation of an AV source port function.

FIG. 7 is a flow diagram illustrating an example implementation of process-not-direct-connection function. In step 701, the function retrieves a pointer to switch input port object for the primitive circuit of the primitive source port object. In step 702, the function retrieves a pointer to the primitive source port object. In step 703, the function retrieves a pointer to the output switch port object of the retrieved primitive circuit. In step 704, the function creates a connection between the input switch port object and the output switch port object. The function then returns.

```
class AvPort
{
    getOwnerObjectPtr (resultPtr);
    isCompletePort( );
    isPrimitivePort( );
    getParentPortPtr(portPtr);
    getNumberOfChildPorts(number);
    getChildPortPtr(number, portPtr);
    setProperty(resetIn);
    setProperty(resetOut);
}
getOwnerObjectPtr (resultPtr);
```

This function returns a pointer to the owner object of the port. The owner of the port is the object that directly contains a complete port. Each port within the port hierarchy as the same owner object.

This function returns an indication as to whether this port is a complete port.

isPrimitivePort( );

This function returns an indication as to whether this port is a primitive port.

getParentPortPtr(portPtr);

This function returns a pointer to the parent port of this port. The parent port is that port which is the next higher port in the port hierarchy.

getNumberOfChildPorts(number);

This function returns the number of child ports of this port.

getChildPortPtr(number, portPtr);

This function returns a pointer to the child port designated by the passed port.

```
class AvSinkPort : AvPort
{
    isConnectedToStream( );
    getAvStreamPtr(streamPtr);
    assignStream(streamPtr, number);
    unassignStream( );
    getNumberOfAssignments(number);
    getAssignmentsPtrs(number, assignedSignalPtr, toPrimitivePortPtr)
    connectToAssignedStream( );
}
isConnectedToStream( );
```

This function retains an indication whether this sink port is connected to a stream.

getAvStreamPtr(streamPtr);

This function returns a pointer to the stream to which this sink port is connected.

assignStream(streamPtr);

This function informs a sink port that it is to consider the signals within a stream for the purpose of assigning them to a primitive sink port.

unassignStream( );

This function undoes the assigning.

getNumberOfAssignments(number);

This function returns the number of assignments between a signal and a primitive sink port that was made during the assignment.

getAssignmentsPtrs(number, assignedSignalPtr, toPrimitivePortPtr);

This function is passed an assignment number and returns an indication of the signal that is assigned to the primitive port.

connectToAssignedStream( );

This function is used to inform a complete sink port and its container of the assigned stream so that any action appropriate to the connection can be taken, such as powering on the output component.

```
class AvSignal
{
    getSignalUsage(usage);
    getSignalFormat(format);
    getParentStreamPtr(streamPtr);
    getSourcePortPtr(sourcePortPtr);
}
getSignalUsage(usage);
```

This function returns the usage of the signal. The usage may be, for example, left audio or the red of an RGB signal.

getSignalFormat(format);

This function returns the format of the signal. The format may be, for example, 601 video or AES audio.

getParentStreamPtr(streamPtr);

This function returns a pointer to the stream which is the parent of this signal.

That is, the primitive stream that is carrying the signal.

getSourcePortPtr(sourcePortPtr);

This function returns a pointer to the primitive source port that is outputting this signal.

```
class AvStream
{
    isCompleteStream( );
    isPrimitiveStream( );
    getParentStreamPtr(streamPtr);
    getNumberOfChildStreams(number);
    getChildStreamPtr(number, streamPtr);
    getSourcePortPtr(sourcePortPtr);
    getSourceProgramPtr(sourceProgramPbr);
    getSignalPtr(signalPtr);
}
IsCompleteStream( );
```

This function returns an indication as to whether this stream is a complete stream.

IsPrimitiveStream( );

This function returns an indication as to whether this stream is a primitive stream.

getParentStreamPtr(streamPtr);

This function returns a pointer to the stream that is the parent of this stream.

getNumberOfChildStreams(number);

This function returns the number of child streams of this stream.

getChildStreamPtr(number, streamPtr);

This function returns a pointer to the numbered child stream of this stream.

getSourcePortPtr(sourcePortPtr);

This function returns a pointer to the source port that is producing this stream. The source port is at the same level in its hierarchy as this stream is in its hierarchy.

getSourceProgramPtr(sourceProgramPtr);

This function returns a pointer to the source program that is producing this stream.

getSignalPtr(signalPtr);

This function returns a pointer to the signal in this stream is a primitive stream.

```
class AvPrimitiveCircuit
{
    getSourcePortPtr(sourcePortPtr);
    getSinkPortPtr(sinkPortPtr);
}
getSourcePortPtr(sourcePortPtr);
```

This function returns a pointer to the primitive source port of this primitive circuit.

getSinkPortPtr(sinkPortPtr);

This function returns a pointer to the primitive sink port of this primitive circuit.

```
class AvInputSwitchPort : AvSinkPort
{
    getNumberOfConnections(number);
    getConnectionPtr(number, outputSwitchPortPtr);
    createConnection(outputSwitchPortPtr);
    removeConnection(outputSwitch.PortPtr);
}
getNumberOfConnections(number);
```

This function returns the number connections from this input switch port to output switch ports.

getConnectionPtr(number, outputSwitchPortPtr);

This function returns a pointer to the numbered output switch port that is connected to this input switch port.

createConnection(outputSwitchPortPtr);

This function creates a connection from this input switch port to the passed output switch port.

removeConnection(outputSwitchPortPtr);

This function removes a connection from this input switch port to the passed output switch port.

```
class AvOutputSwitchPort : AvSourcePort
{
    getInputConnectionPtr(inputSwitchPortPtr);
}
getInputConnectionPtr(inputSwitchPortPtr);
```

This function gets the input switch port to which this output switch port is connected.

```
class AvVirtualCircuit
{
    getCompleteSourcePort(sourcePortPtr);
    getCompleteSinkPort(sinkPortPtr);
    getNumberOfPrimitiveBindings(number);
    getPrimitiveBindingPtrs(number, sourcePortPtr, sinkPortPtr);
}
getCompleteSourcePort(sourcePortPtr);
```

This function returns a pointer to the complete source port that is producing the signals being routed by this virtual circuit.

getCompleteSinkPort(sinkPortPtr);

This function returns a pointer to the complete source port that is receiving the signals being routed by this virtual circuit.

getNumberOfPrimitiveBindings(number);

This function returns the number of bindings between primitive source ports and primitive sink ports this virtual connection.

getPrimitiveBindingPtrs(number, sourcePortPtt, sinkPortPtr);

This function returns the numbered binding as a pointer to the primitive source port and a pointer to the primitive sink port.

```
AvSourcePort
class AvSourcePort : AvPort
{
    isActiveSourcePort( );
    getAvStreamPtr(streamPtr);
    getPrimitiveCircuitPtr(primitiveCircuitPtr);
    getNumberOfVirtualCircuits(number);
    getVirtualCircuitPtr(number, virtualCircuitPtr);
    createVirtualCircuit(toSinkPortPtr);
    removeVirtualCircuit(toSinkPortPtr);
}
isActiveSourcePort( );
```

According to a step 902 of an example method 900 (including steps 902, 904, 906, 908, 910 and 912), this function returns an in indication of whether this source is active. A source port is active when it is capable of producing a signal.

getAvStreamPtr(streamPtr);

This function returns a pointer to the stream associated with this source port.

getPrimitiveCircuitPtr(primitiveCircuitPtr);

At a step 908, this function returns a pointer to the primitive circuit associated with this source port if this is a primitive source port.

getNumberOfVirtualCircuits(number);

This function returns the number of virtual circuits that are associated with this source port.

getVirualCircuitPtr(number, virtualCircuitPtr);

This function returns a pointer to the numbered virtual circuit.

createVirtualCircuit(toSinkPortPtr);

This function creates a virtual circuit that connects this source port to the passed sink port.

removeVirtualCircuit(toSinkPortPtr);

This function removes the virtual circuit that connects the source port to the passed sink port.

Figure 9:
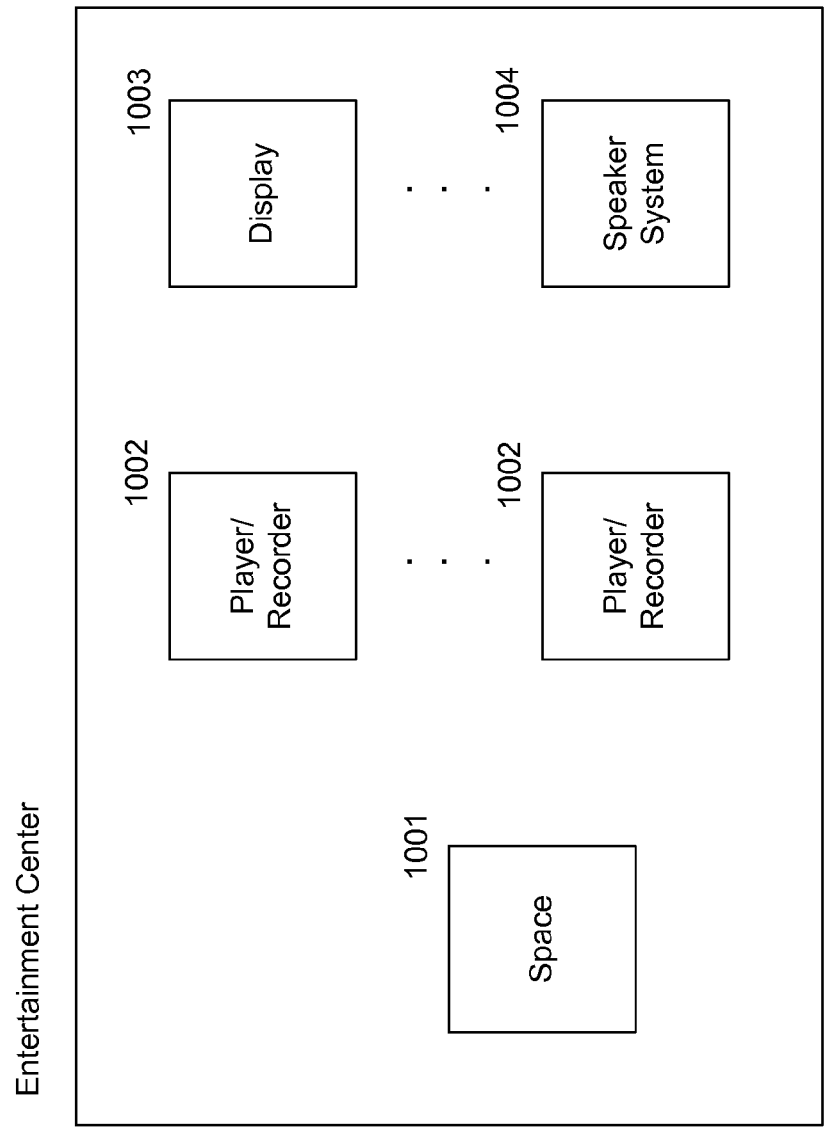
FIG. 9 is a block diagram illustrating the components of an entertainment center.

FIG. 9 is a block diagram illustrating the components of an entertainment center. An entertainment center component provides a behavior that allows an AV program to be assigned to a player/recorder component. When a program is assigned to an entertainment center, the entertainment center performs the processing that is needed to load that program into a player/recorder, cause the program to be played, and route the output signals of the player/recorder component to output components. An entertainment center may be associated with a space (e.g, a room within a house). The entertainment center may also be associated with multiple player/recorders and multiple output components such as a display component and a speaker subsystem component. The AV system represents the associated space by a space object 1001, represents the player/recorder components by player/recorder objects 1002, and represents the output components by a display object 1003 and a speaker subsystem object 1004. An entertainment center may have a default set of the output components. When a program is assigned to the entertainment center, the output signals for the player/recorder component are routed to these default output components. The entertainment center controls the creating of virtual circuits that are needed to effect this routing. The entertainment center may also allow the output signals of a player/recorder component to be dynamically routed to different output components. For example, the entertainment center may allow the output of the player/recorder component to be dynamically routed to a speaker system component associated with another space. To effect this dynamic routing, the AV system creates and destroys virtual circuits dynamically. In one embodiment, the entertainment center may determine for each of its output components whether the routing should be allowed, whether to be notified when an output signal is routed due to an action external to the entertainment center, and whether to provide a user interface for controlling the output component to which the signal is routed. These determinations may be different for each output component associated with the entertainment center. When an entertainment center is notified that one of its output components has been routed due to an external action (e.g. a different entertainment center routing to the output component causing the notification), the entertainment center can become an additional controller of the player/recorder. An entertainment center may also provide property notifications when the properties of its associated player/recorder components or output components change. For example, the entertainment center may notify a corresponding user interface component that the pause button on a player/recorder component has been depressed. An entertainment center object may provide a user interface component that is appropriate for controlling the user interface of the input components and output components associated with the entertainment center.

Figure 10:
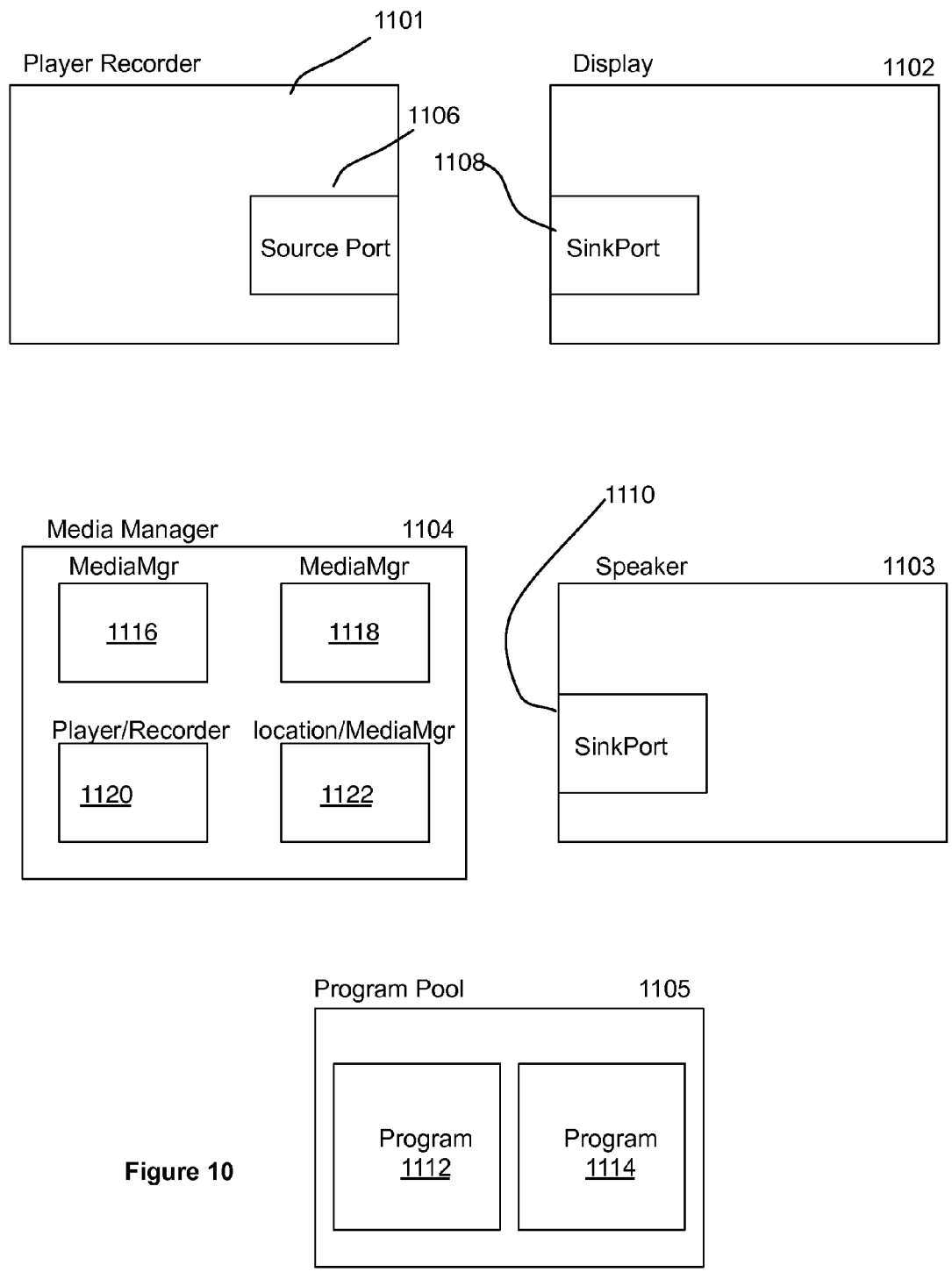
FIG. 10 illustrates a block diagram illustrating various components of the AV system.

FIG. 10 illustrates a block diagram illustrating various components of the AV system. The AV system includes player/recorder objects 1101, display objects 1102, speaker system objects 1103, media manager objects 1104, and program objects 1105. A player/recorder object has one or more complete source port objects 1106 associated with it and may have one or more complete sink port objects associated with it. Each output object has one or more complete sink ports 1108, 1110 associated with it. A player/recorder object typically corresponds to a physical player/recorder component, such as a laserdisc player. The player/recorder object provides a behavior to load an AV program into the player/recorder component. A player/recorder object also provides a behavior that allows commands to be sent to the player/recorder component. For example, after a laserdisc has been loaded, a start, pause, or stop command can be sent via the player/recorder object to the player/recorder component. The player/recorder object also provides the behavior to determine whether a particular AV program can be loaded into the player/recorder component. A player/recorder object may also provide additional behavior that is customized to the characteristics of the corresponding player/recorder component.

The output objects that correspond to the output components provide a behavior that returns the identification of a sink port object that is appropriate for assigning the signals associated with a specified stream object. For example, a speaker system object that is passed a stream that includes both video and audio signals would return an indication that only audio sink ports are to be assigned. The output objects may also provide additional behavior that is specific to the type of output component. For example, a display object may provide behavior for turning the display on and off and for controlling the contrast of the display. A speaker system object may provide behavior for controlling the volume, equalizer functions, and surround sound system controls.

This additional behavior may be part of the base object class or may be provided through a derivation of that base object class.

A program pool object 1105 represents a collection of AV programs. Each AV program has a corresponding program object 1112, 1114. An AV program conceptually corresponds to a media that can be played by a player/recorder component. For example, an AV program may represent the feed provided through a certain television channel, a musical score stored on a CD, a movie stored on a laserdisc, and so on. These AV programs can be hierarchically organized to represent more complex AV programs. For example, an AV program may include a sub-AV program corresponding to the feed from a television channel and a sub-AV program corresponding to the output of a computer program. Thus, AV programs can represent arbitrarily complex multimedia programs. The AV system represents an AV program by a program object 1112, 1114. A program object 1112, 1114 provides the behavior to browse through the hierarchy of the AV programs represented by that program object 1112, 1114, allows a player/recorder component to be assigned to the AV program, and provides a behavior corresponding to the loading of the AV program into the player/recorder component. A program object 1112, 1114 also has a program ID, which provides descriptive information about the AV program. For example, descriptive information may include the name of the movie that the AV program represents. A program object 1112, 1114 stores the location of the media that corresponds to the AV program. For example, if the AV program corresponds to a laserdisc in a certain laserdisc stack, then the location would indicate the stack and slot of the laserdisc within the stack. In one embodiment, the location is represented as a path within a hierarch of locations. A program object 1112, 1114 stores the identifier of an owner, which may be the program pool object that the program object 1112, 1114 is within. A program object 1112, 1114 allows for the retrieving of its child program objects and may allow for certain criteria to be established so that only children that match the criteria are returned. A program object 1112, 1114 may also allow for retrieving of its parent program object. In one embodiment, the parent program object may be retrieved through the containing program pool by providing the location of the program object 1112, 1114 to the program pool. A program object 1112, 1114 has a program type associated with it. The program type specifies a path through a hierarchy of program types. The hierarchy of program types is described below in detail.

In one embodiment, the AV system provides a capability for resolving a program ID into many different types of references. For example, the AV system may provide a get program object function that inputs a program ID and returns a reference to a corresponding program object. The AV system may also provide a get program genre function that inputs a program ID and returns a set of program objects in the same genre. For example, a program ID for a country music song when provided to the get program genre function would return references to program objects corresponding to other country music songs. To implement such multi-resolution references, the functions may access the program object associated with the program ID to retrieve information on its genre.

A program object may provide alternate interfaces for maintenance of state. For example, a program object may provide an interface for adding and deleting properties of the program object and setting properties of the program object. An alternate interface may also provide for the adding and deleting of child program objects or for the deleting of the program object itself. These interfaces may be specific to the type of AV program represented by the program object.

A program pool has a corresponding program pool object. A program pool object provides an access port for each client that is accessing the program pool. The program pool object provides a function that receives a program ID and returns a reference to a program object corresponding to that program ID. A program pool object also allows for database cursor-like access to the program objects. For example, a query can be submitted which specifies the criteria for program objects. The program objects that match that criteria are provided in a result set. The client can access that result set using techniques such as advance to the next program object, get reference for the current program object, and return a set of references for the program objects in the result set. In one embodiment, the result set of a query may be cached at a client to reduce communications between the clients in the program pool. The program pool may also automatically update the client's cache as the set of programs that match the criteria changes. In one embodiment, the program pool provides an access control mechanism to restrict access by certain clients. The program pool may use the phantom object mechanism as described in U.S. application Ser. No. 09/322,455, entitled "Method and System for Tracking Clients."

The media manager 1104 provides a mechanism for managing media at its location and for providing a player/recorder object for the media itself. For example, a media manager object may correspond to a multi-laserdisc stack. The media manager object provides a load program function that is passed a program object and that returns a player/recorder object with the program loaded. A media manager may be hierarchically organized. That is, a media manager object may have child media manager objects 1116, 1118, 1120 to an arbitrary level of nesting. Each parent media manager object may also have an associated location table 1122. The location table 1122 maps the location of a program to the media manager object that is responsible for returning the player/recorder object for that program object. A media manager object that has no child object may process the location of the program object to identify which player/recorder to associate with the program object. For example, if a media manager object represents a multi-laserdisc stack, then the media manager object may use the location associated with that program object to determine which slot in the stack contains the media for that program.

Figure 11:
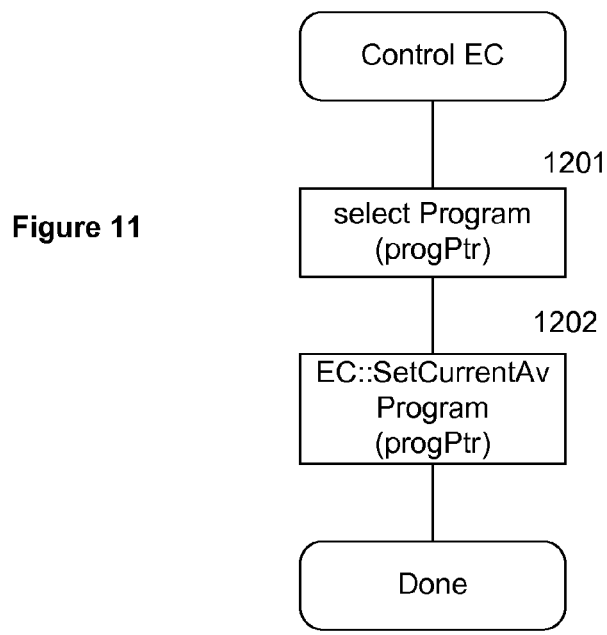
FIG. 11 is a flow diagram illustrating the assigning of a program to an entertainment center.

FIG. 11 is a flow diagram illustrating the assigning of a program to an entertainment center. In step 1201, the function invokes a function to select a certain program object. The invoked function returns a pointer to the program object. In step 1202, the function invokes the set current program function of the entertainment center object passing the pointer to the program object. The processing is then complete.

Figure 12:
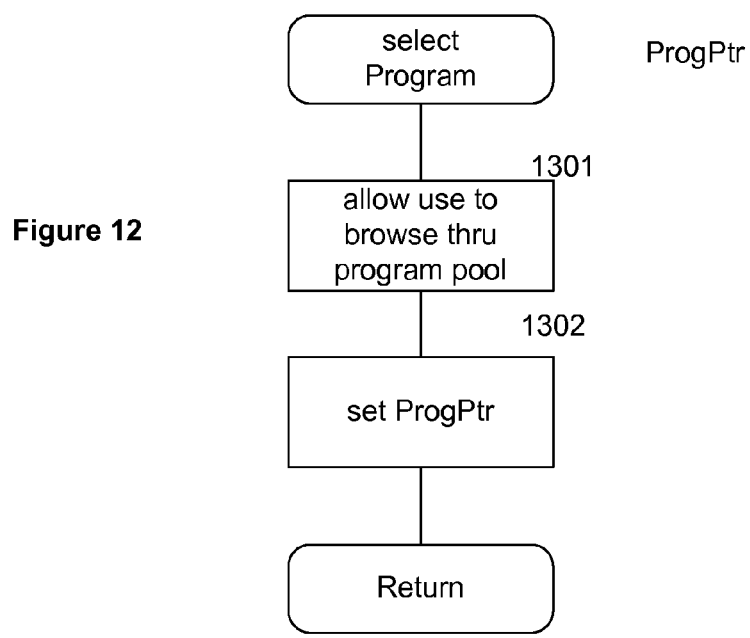
FIG. 12 is a flow diagram of function to select a program.

FIG. 12 is a flow diagram of a function to select a program. This function may display a user interface that allows a user to browse through the programs in a program pool. The user interface may allow the user to specify various search criteria. For example, the user interface may allow the user to specify the type of music that is of interest. In step 1301, the function allows the user to select a program from the program pool. In step 1302, the function sets the return pointer to a pointer to a program object representing the program. The function then returns.

Figure 13:
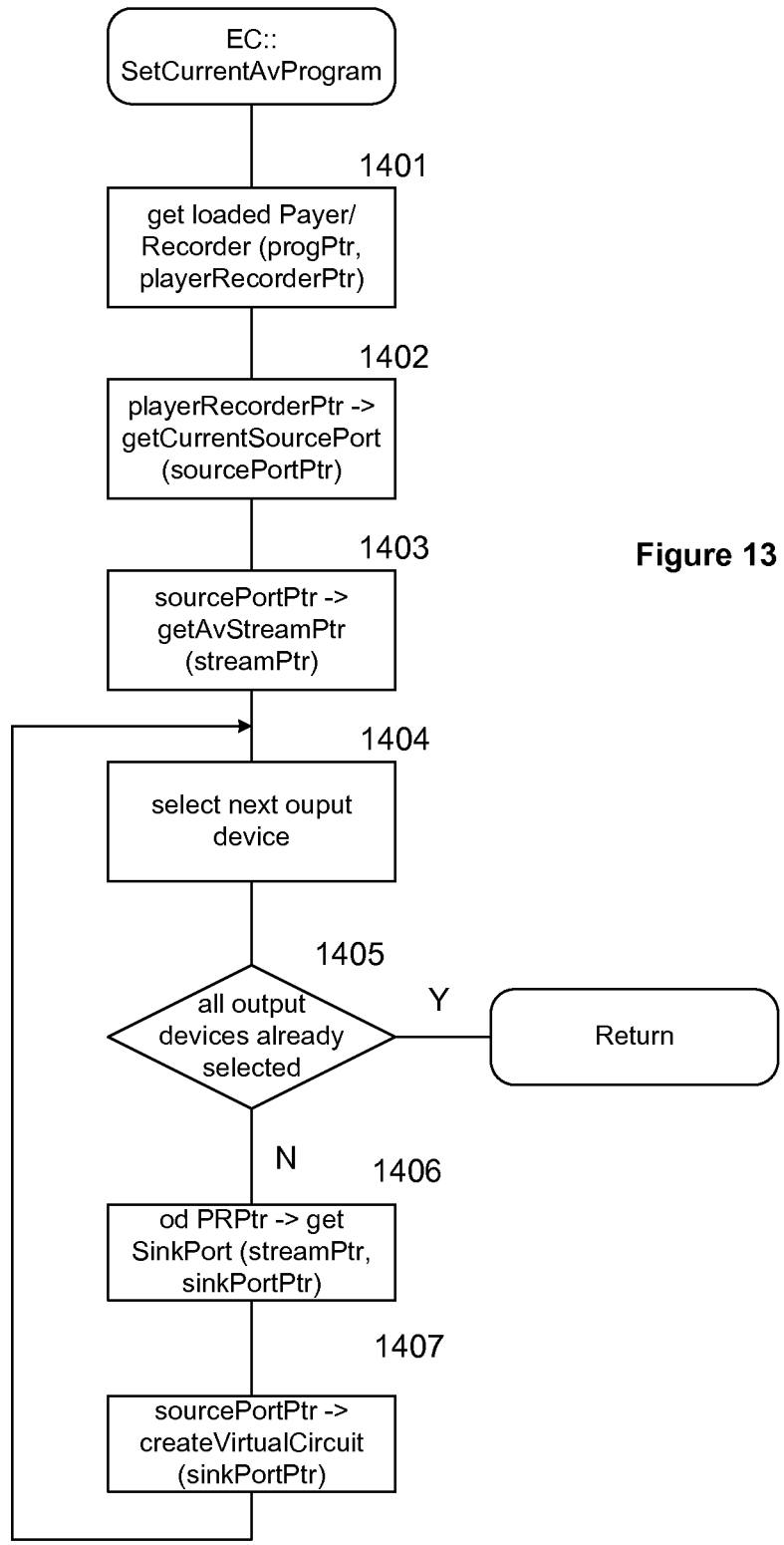
FIG. 13 is a flow diagram representing an example implementation of a set current program function of an entertainment center object.

FIG. 13 is a flow diagram representing an example implementation of a set of current program function of an entertainment center object. This function is passed a pointer to a program object and effects the loading of that program within the entertainment center. In step 1401, the function invokes a function to retrieve a loaded player/recorder object. The function passes a pointer to the program object and is returned a pointer to a player/recorder object that is loaded with the program. In step 1402, the function invokes the get current source function of the player/recorder object. That invoked function returns a pointer to the complete source port for the player/recorder object. In step 1403, the function invokes the get stream pointer function of the source port object to retrieve a pointer to the complete stream for that source port object. In steps 1404-1407, the function loops selecting the output components associated with the entertainment center and creating a virtual circuit from the player/recorder component to the output components. As described above, a entertainment center may have a default set of output components. In step 1404, the function selects the next output component. In step 1405, if all the output components have already been selected, then the function returns, else the function continues at step 1406. In step 1406, the function requests the selected output component to return a sink port object that is appropriate to the stream. The function invokes a get sink port function of the output object corresponding to the selected output component. In step 1407, the function invokes the create virtual circuit function of the source port object passing a pointer to the sink port object. That invoked function creates a virtual circuit from the source port to the sink port. The function then loops to step 1404 to select the next output component.

Figure 14:
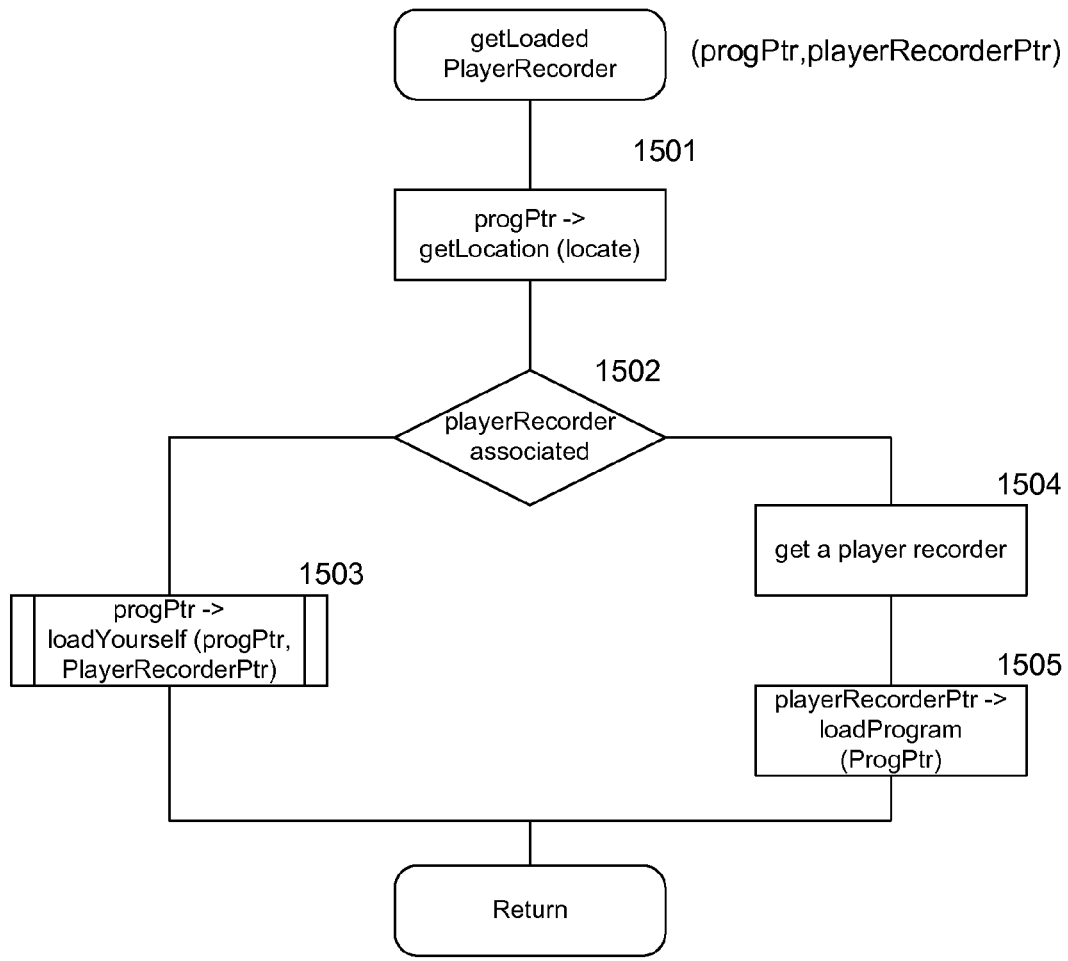
FIG. 14 is a flow diagram of an example implementation of a function to get a loaded player/recorder object.

FIG. 14 is a flow diagram of an example implementation of a function to get a loaded player/recorder object. This function is passed a pointer to a program object and returns a pointer to a player/recorder object. In step 1501, the function retrieves the location of the program object. In step 1502, if the location indicates that a player/recorder component is already associated with this program object, then the function continues at step 1503, else the function continues at step 1504. In step 1503, the function invokes the load yourself function of the program object and receives a pointer to a loaded player/recorder object in return. In step 1504, the function gets a player/recorder object that is appropriate to the entertainment center. In step 1505, the function invokes a load program function of the player/recorder object passing the pointer to the program object. The function then returns.

Figure 15:
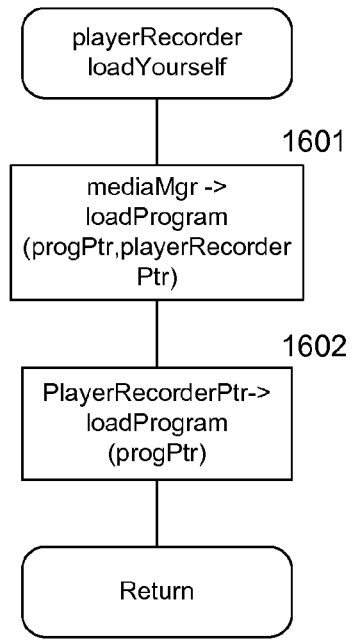
FIG. 15 is a flow diagram of example implementation of the load yourself function 20 of the player/recorder object.

FIG. 15 is a flow diagram of example implementation of the load yourself function of the player/recorder object. This function is passed a pointer to a program object that is to be loaded into the player/recorder component. In step 1601, the function invokes a load program function of the media manager object passing a pointer to the program object and receiving a pointer to a player/recorder in return. In step 1602, the function invokes the load program function of the player/recorder object passing the program pointer and then returns.

Figure 16:
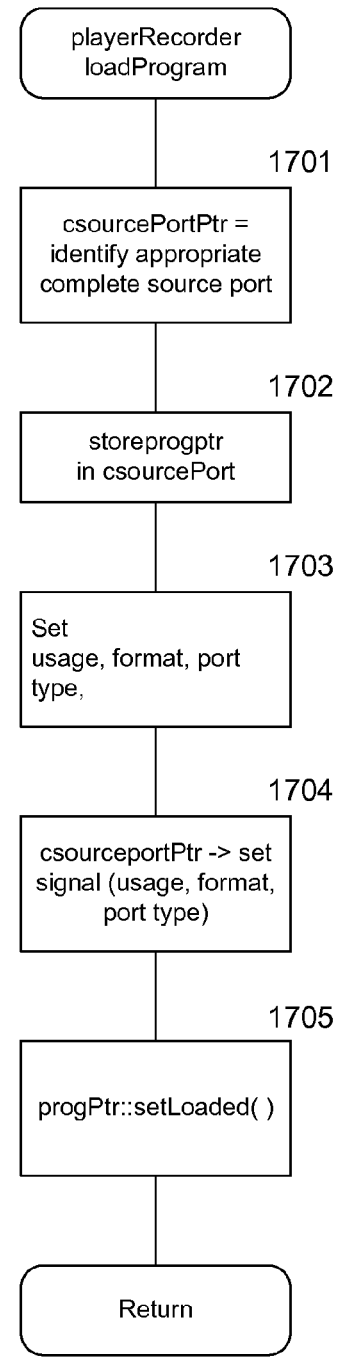
FIG. 16 is a flow diagram of an example implementation of the load program function of a player/recorder object.

FIG. 16 is a flow diagram of an example implementation of the load program function of a player/recorder object. This function is passed a pointer to a program object and effects the loading of the program into that player/recorder component. In step 1701, the function identifies a complete source port that is appropriate for the passed program. A player/recorder component may have more than one complete source port. For example, a player/recorder object may have a complete source for corresponding to an RGB signal and another complete source port corresponding to a digital video signal. In step 1702, the function assigns the program object to the player/recorder object. In step 1703, the function determines the usage, format, and port type for the primitive ports of the selected source port. In step 1704, the function invokes the set signal function of the complete source port passing the usage, format, and port type. The invoked function sets the usage, format, and port type for each primitive source port. In step 1705, the function notifies the program object that it has now been loaded. The function then returns.

Figures 17, 18:
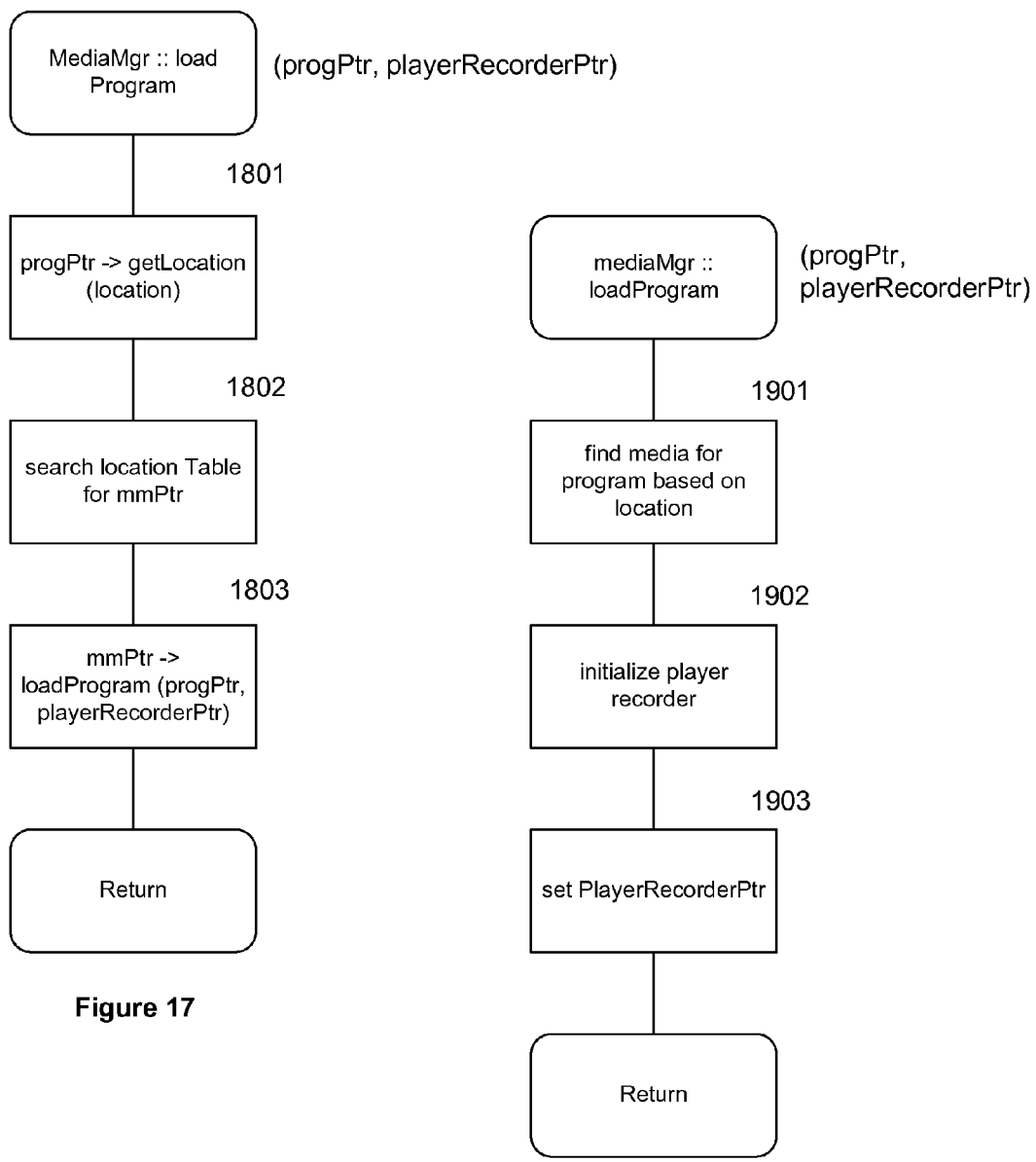
FIG. 17 is a flow diagram of an example load program function of a media manager object.
FIG. 18 is a flow diagram of another example load program function of the media manager object.

FIG. 17 is a flow diagram of an example load program function of a media manager object. This example function describes the processing that may be performed when the media manager has child media manager objects. This function is passed a pointer to a program object and returns a pointer to a player/recorder object. In step 1802, the function invokes the get location function of the program object to retrieve the location of the media as indicated by the program object. In step 1801, the function searches the location table for a media manager object that manages the media corresponding to the program object. In step 1803, the function invokes the load program function of the located media manager object and then returns.

FIG. 18 is a flow diagram of an another example load program function of the media manager object. This example function describes the processing that may be performed when the media manager object has no child media manager object. In step 1901, the function retrieves the location from the program object and finds the media associated with that location. In step 1902, the function initializes a player/recorder object for that media. In step 1903, the function sets a return pointer to point to player/recorder object. The function then returns.

```
class Program
{
    getProgramId(Id);
    getProgramType(type);
    getProgramLocation(location);
    getDescProptery ValueByName(name, value);
    getOwnerObjectPtr(ownerPtr);
    getPlayerRecorderPtr(prPtr);
    loadYourself( );
    unloadYourself( );
    getParent(parentPtr);
    getChild(childPtr);
}
class ProgramPool
{
    getPort(progPoolPortPtr);
}
class ProgPoolPort
{
    getReference(id, progPtr);
    getCursor(progPoolCursorPtr);
}
class ProgramPoolCursor
{
    getMatchingSetOfReferences(set);
    submitQuery(query);
    advance( );
    getReference(progPtr);
    clone(ProgPoolPtr);
}
class PlayerRecorder
{
    canLoadProgram(progPtr);
    loadProgram(progPtr);
    sendControlCommand(command);
}
class EntertainmentCenter
{
    setCurrentActiveSourceProgram(progPtr);
}
```

One skilled in the art would appreciate that various modifications can be made to the present invention. Accordingly, the invention is not limited to the specific embodiments, but instead the scope of an invention is specified by the following claims.

What is claimed:

1. An audio/visual system, comprising:
    at least one player/recorder physical component having a source port associated with a type of an output signal and connectable to at least one input port of another player/recorder physical component;
    at least one media manager object;
    at least one audio/visual program; and
    at least one player/recorder object associated with the at least one player/recorder physical component and having a source port object associated with the source port of the at least one player/recorder physical component with which the at least one player/recorder object is associated, the source port object comprising a data structure stored in a memory, the data structure storing a pointer to a stream object;
    wherein in accordance with a selection of an audio/visual program of said at least one audio/visual program, said media manager dynamically loads a player/recorder object of said at least one player/recorder object for one of playing and recording said selected audio/visual program using the player/recorder physical component associated with the dynamically loaded player/recorder object.

2. An audio/visual system according to claim 1, wherein the source port outputs a stream comprising a plurality of hierarchically organized signals corresponding to components of the audio/visual program.

3. An audio/visual system according to claim 1, wherein a media manager object manages a collection of related audio/visual program entries and corresponding player/recorder components.

4. An audio/visual system according to claim 3, wherein a media manager object allocates shared source ports and shared sink ports to dynamically create at least one virtual circuit path for the selected audio/visual program entry.

5. An audio/visual system, comprising:
    at least one player/recorder physical component having a source port associated with a type of an output signal and connectable to at least one input port of another player/recorder physical component;
    at least one audio/visual program comprising a plurality of hierarchically organized stream objects, each stream object assigned to a player/recorder physical component; and
    at least one player/recorder object associated with the at least one player/recorder physical component and having a source port object comprising a data object stored in a memory and associated with the source port of the at least one player/recorder physical component with which the at least one player/recorder object is associated, the data object storing a pointer to a stream object;
    wherein in accordance with a selection of an audio/visual program of said at least one audio/visual program, the stream objects of said audio/visual program are provided to player/recorder physical components associated with the stream objects.

6. A computer-implemented method, comprising:
    generating at least one media manager object using a computing device;
    generating at least one audio/visual program using the computing device;
    generating at least one player/recorder object using the computing device, the player/recorder object associated with a player/recorder physical component of an audio/visual system and having a source port object associated with a source port of the player/recorder physical component, the source port object comprising a data object that stores a pointer to a stream object; and
    in accordance with a selection of an audio/visual program of said at least one audio/visual program, dynamically loading by said media manager object a player/recorder object of said at least one player/recorder object for one of playing and recording said selected audio/visual program using the player/recorder physical component associated with the dynamically loaded player/recorder object.

7. A method according to claim 6, further comprising resolving by hierarchically organized media manager objects of said at least one media manager object a player/recorder component when the audio/visual program is presented to the media manager object.

8. A method according to claim 6, further comprising managing by a media manager object a collection of related audio/visual program entries and corresponding player/recorder components.

9. A method according to claim 8, further comprising allocating by a media manager object shared source ports and shared sink ports to dynamically create at least one virtual circuit path for the selected audio/visual program entry.

10. A computer-readable storage medium, other than a modulated data signal, storing computer-executable instructions implementing at least one of an operating system, driver code, an application programming interface, a tool kit and a processing device for providing the method of claim 6.

11. A computer-readable storage medium, other than a modulated data signal, storing computer executable instructions for performing the method of claim 6.

12. A computing device comprising means for performing the method of claim 6.

13. A computer-implemented method, comprising:
    instantiating, in a computing device, at least one player/recorder object associated with a player/recorder physical component and having a source port object associated with a source port of the player/recorder physical component, the source port object storing a pointer to a stream object; and
    using the computing device to provide an audio/visual program to the player/recorder physical component associated with a player/recorder object of said at least one player/recorder object in accordance with a selection of the audio/visual program.

14. A computer-readable storage medium, other than a modulated data signal, storing computer-executable instructions implementing at least one of an operating system, driver code, an application programming interface, a tool kit and a processing device for providing the method of claim 13.

15. A computer-readable storage medium, other than a modulated data signal, storing computer executable instructions for performing the method of claim 13.

16. A computing device comprising means for performing the method of claim 13.

* * * * *